United States Patent
Obbard

(10) Patent No.: US 9,614,854 B2
(45) Date of Patent: Apr. 4, 2017

(54) SYSTEM AND METHOD FOR MAINTENANCE OF TRANSITIVE CLOSURE OF A GRAPH AND USER AUTHENTICATION

(71) Applicant: Open Text SA ULC, Halifax (CA)

(72) Inventor: Geoffrey Michael Obbard, Waterloo (CA)

(73) Assignee: Open Text SA ULC, Halifax (CA)

(*) Notice: Subject to any disclaimer, the term of this patent is extended or adjusted under 35 U.S.C. 154(b) by 0 days.

(21) Appl. No.: 14/668,666

(22) Filed: Mar. 25, 2015

(65) Prior Publication Data

US 2015/0281247 A1     Oct. 1, 2015

Related U.S. Application Data

(60) Provisional application No. 61/970,214, filed on Mar. 25, 2014.

(51) Int. Cl.
*G06F 17/30* (2006.01)
*G06F 7/04* (2006.01)
(Continued)

(52) U.S. Cl.
CPC ...... *H04L 63/101* (2013.01); *G06F 17/30011* (2013.01); *G06F 17/30345* (2013.01);
(Continued)

(58) Field of Classification Search
CPC ............. G06F 21/6209; G06F 21/6218; G06F 17/30103; G06F 17/30011; G06F 17/30958;
(Continued)

(56) References Cited

U.S. PATENT DOCUMENTS 4,930,072 A * 5/1990 Agrawal ........... G06F 17/30513
5,201,046 A * 4/1993 Goldberg ........... G06F 17/30595
(Continued)

OTHER PUBLICATIONS

Dar, Shaul, and Raghu Ramakrishnan. "A performance study of transitive closure algorithms." ACM SIGMOD Record. vol. 23. No. 2. ACM, 1994.*

(Continued)

*Primary Examiner* — Michael Simitoski
(74) *Attorney, Agent, or Firm* — Sprinkle IP Law Group

(57) ABSTRACT

Disclosed can improve rights list management as well as performance of systems utilizing an access control list. A database server having a transitive closure management module may receive an identification of an entity defined in a database storing a cached transitive closure. The transitive closure management module may incrementally update the cached transitive closure stored in the database by generating a new transitive closure for the entity and determining a delete transitive closure record. The delete transitive closure record may be determined by analyzing the cached transitive closure and the new transitive closure, determining a first transitive closure path for the entity that is not specified in the new transitive closure and that is specified in the cached transitive closure, and selecting as the delete transitive closure record a record specifying the first transitive closure path. The delete transitive closure record can then be deleted from the cached transitive disclosure.

15 Claims, 16 Drawing Sheets

(51) Int. Cl.
*H04L 9/32* (2006.01)
*H04L 29/06* (2006.01)
*G06F 21/62* (2013.01)
*G06F 12/08* (2016.01)
*H04L 29/08* (2006.01)

(52) U.S. Cl.
CPC .... *G06F 17/30958* (2013.01); *G06F 21/6209* (2013.01); *H04L 63/104* (2013.01); *H04L 67/28* (2013.01)

(58) Field of Classification Search
CPC ......... G06F 17/30345; G06F 17/30327; G06F 17/30424; G06F 17/30457; G06F 2221/2145; H04L 63/104; H04L 63/101; H04L 67/28
See application file for complete search history.

(56) References Cited

U.S. PATENT DOCUMENTS

| | | | | |
|---|---|---|---|---|
| 5,752,241 | A | 5/1998 | Cohen | |
| 5,819,257 | A | 10/1998 | Monge et al. | |
| 6,029,162 | A * | 2/2000 | Schultz | G06F 17/30327 |
| 6,633,886 | B1 * | 10/2003 | Chong | G06F 17/30595 707/798 |
| 7,346,921 | B2 * | 3/2008 | Murren | G06F 21/6218 705/51 |
| 7,904,642 | B1 * | 3/2011 | Gupta | G06F 17/30982 711/108 |
| 8,402,514 | B1 * | 3/2013 | Thompson | H04L 63/08 726/4 |
| 8,799,329 | B2 * | 8/2014 | Lamanna | G06F 17/30595 707/798 |
| 9,026,524 | B1 * | 5/2015 | Goldman | G06F 17/30466 707/714 |
| 2002/0186260 | A1 * | 12/2002 | Young | G06F 21/604 715/853 |
| 2005/0097061 | A1 * | 5/2005 | Shapiro | G06F 21/6209 705/67 |
| 2006/0089932 | A1 * | 4/2006 | Buehler | H04L 63/105 |
| 2006/0156020 | A1 * | 7/2006 | Minium | G06F 21/6218 713/182 |
| 2007/0214497 | A1 * | 9/2007 | Montgomery | G06F 21/6218 726/4 |
| 2007/0261102 | A1 * | 11/2007 | Spataro | G06F 21/6218 726/2 |
| 2007/0283443 | A1 * | 12/2007 | McPherson | G06F 21/6218 726/26 |
| 2008/0109870 | A1 * | 5/2008 | Sherlock | H04L 63/1425 726/1 |
| 2008/0306954 | A1 * | 12/2008 | Hornqvist | G06F 21/6218 |
| 2009/0106207 | A1 * | 4/2009 | Solheim | G06F 17/30867 |
| 2010/0318569 | A1 * | 12/2010 | Munday | G06F 21/6227 707/783 |
| 2011/0010758 | A1 * | 1/2011 | Faitelson | G06F 9/468 726/4 |
| 2012/0254254 | A1 * | 10/2012 | Milousheff | G06F 17/30589 707/802 |
| 2013/0124546 | A1 * | 5/2013 | Wormley | H04L 63/101 707/758 |
| 2014/0068718 | A1 * | 3/2014 | Mureinik | G06F 21/604 726/4 |
| 2014/0115003 | A1 * | 4/2014 | Paymal | G06F 21/6227 707/784 |
| 2015/0281246 | A1 * | 10/2015 | Lewis | H04L 63/101 726/4 |
| 2015/0281247 | A1 * | 10/2015 | Obbard | H04L 63/101 726/1 |
| 2015/0281248 | A1 | 10/2015 | Obbard | |
| 2016/0110475 | A1 * | 4/2016 | Latham | G06F 17/30324 707/798 |

OTHER PUBLICATIONS

Dong, Guozhu, and Jianwen Su. "Incremental maintenance of recursive views using relational calculus/SQL." ACM SIGMOD Record 29.1 (2000): 44-51.*
Gadelha Jr, Luiz MR, et al. "Provenance management in Swift." Future Generation Computer Systems 27.6 (2011): 775-780.*
Obrst, Leo, Dru McCandless, and David Ferrell. "Fast Semantic Attribute-Role-Based Access Control (ARBAC)." STIDS. 2013.*
Jiang, Bin. "A suitable algorithm for computing partial transitive closures in databases." Data Engineering, 1990. Proceedings. Sixth International Conference on. IEEE, 1990.*
Dong, Guozhu, et al., "Maintaining Transitive Closure of Graphs in SQL", International Journal of Information Technology, 1999, 51 (1), pp. 46-78.
Office Action for U.S. Appl. No. 14/668,686, mailed Jun. 15, 2016, 16 pgs.
Accetta, Mike et al, "The design of a network-based central file system," No. CMU/CS-80-134, Carnegie-Mellon University, Pittsburgh, PA, Department of Computer Science, 1980, 67 pgs.
Office Action for U.S. Appl. No. 14/668,686, mailed Dec. 7, 2016, 12 pgs.

* cited by examiner

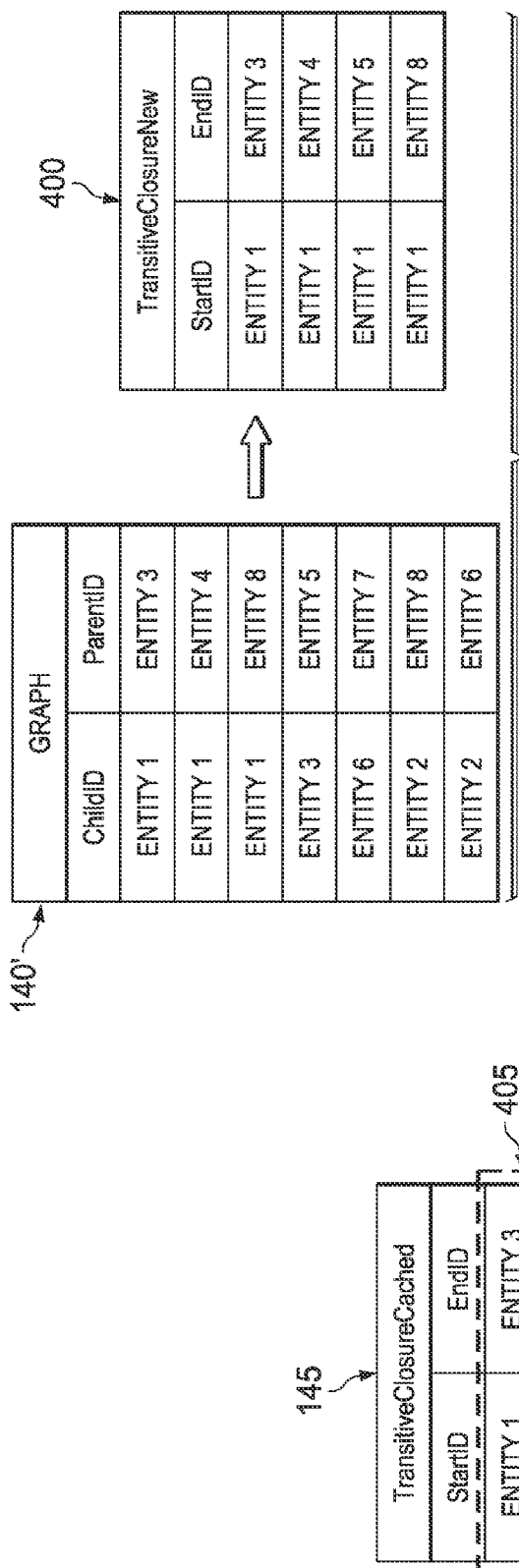
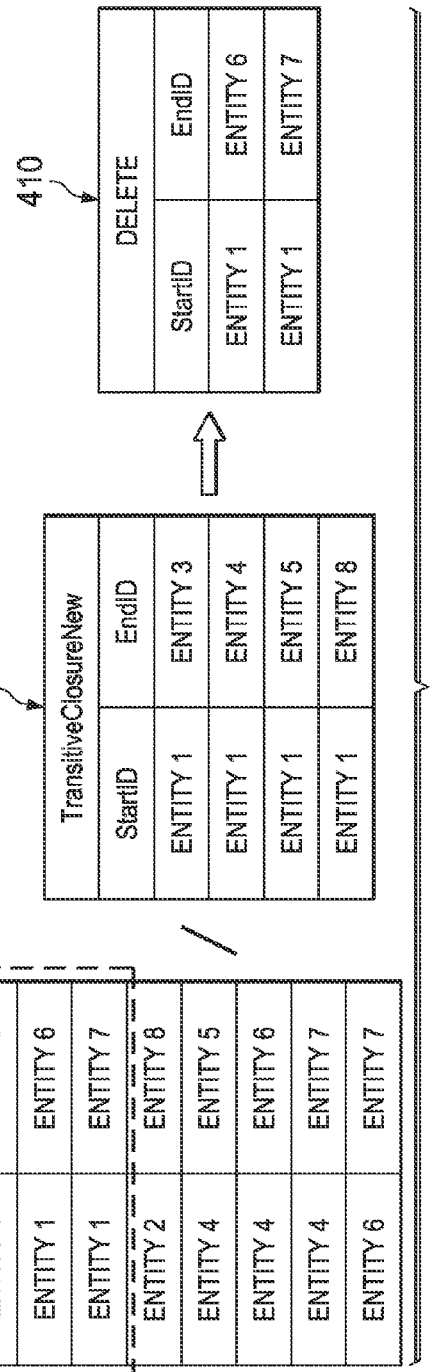
FIG. 4A
FIG. 4B

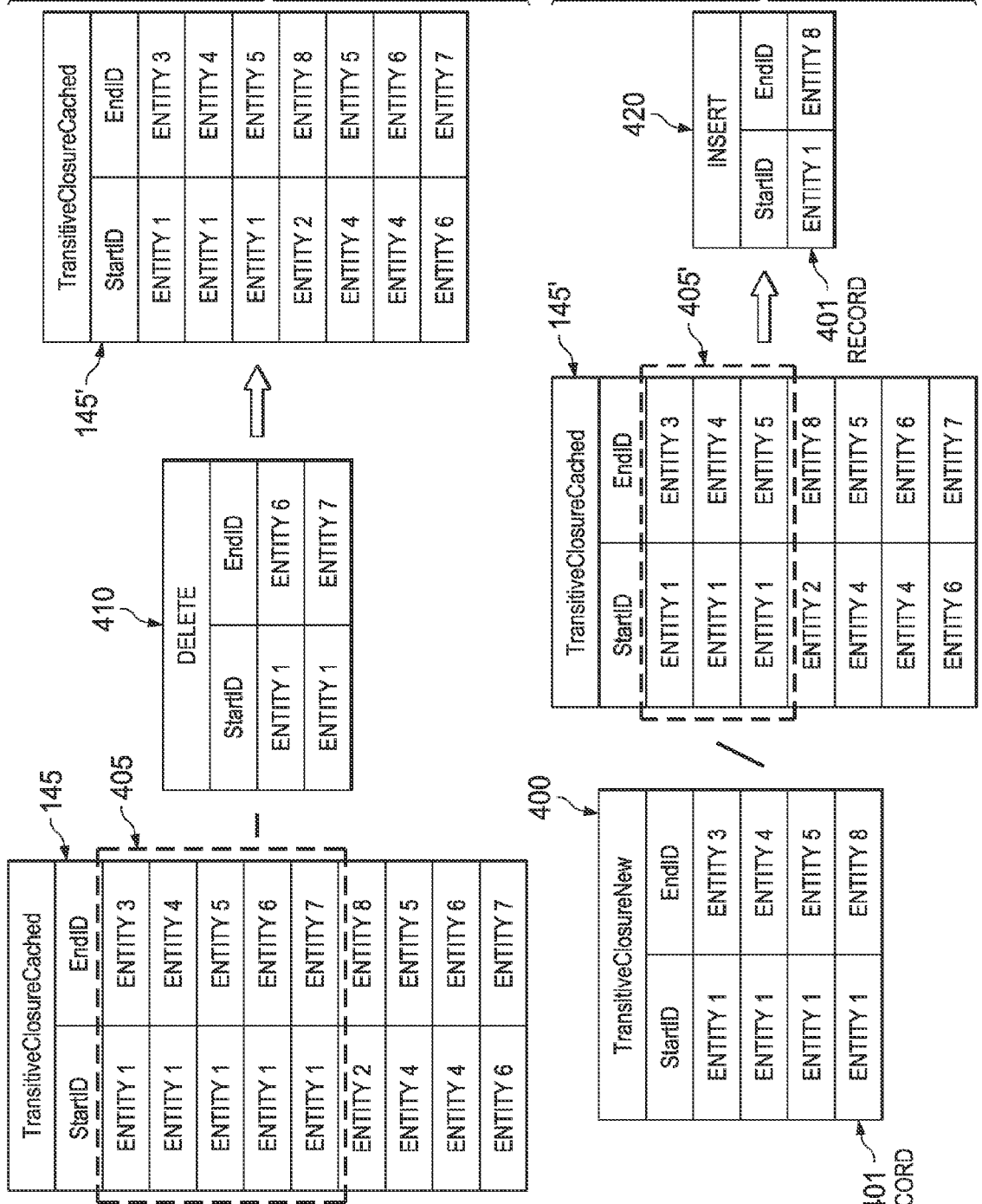

SYSTEM AND METHOD FOR MAINTENANCE OF TRANSITIVE CLOSURE OF A GRAPH AND USER AUTHENTICATION

CROSS-REFERENCE TO RELATED APPLICATION(S)

This application is a conversion of, and claims a benefit of priority under 35 U.S.C. §119 from U.S. Provisional Application No. 61/970,214, filed Mar. 25, 2014, entitled "SYSTEM AND METHOD FOR MAINTENANCE OF TRANSITIVE CLOSURE OF A GRAPH AND USER AUTHENTICATION," which is hereby fully incorporated by reference herein.

TECHNICAL FIELD

This disclosure relates generally to role-based access control to enterprise data. More particularly, embodiments disclosed herein relate to a system, method, and computer program product for managing and maintaining transitive closure for role-based access control and user authentication.

BACKGROUND OF THE RELATED ART

Current systems that rely on hierarchical role-based access control may use an application server that controls access to documents and a database that maintains explicit group memberships. In order to control access, the application server must know the effective group memberships for a principal when checking their authorization to a resource. In a hierarchical role-based access control system, the hierarchy may be nested to any depth. For example, given the group structure where User 1 is a member of Groups A and B, Group B is a member of Groups D and E, and Group E is a member of Group F, then User 1 may be effectively in Groups D, E and F. In this case, membership of User 1 in Group B implies effective membership in Group D and Group E and effective membership in Group E implies effective membership in Group F.

In some systems, each thread of an application server may cache a user rights list that provides effective group memberships. In this case, there is a separate user rights list cache per thread on the application server. There may be many application servers, each running many threads, which leads to very low cache hit rates. The low cache hit rate forces excessive re-computation of user rights lists, which is very CPU (central processing unit) intensive. Moreover, transfer of membership lists or user rights lists (which may contain hundreds of thousands of entries) between the database server, and the application server is very slow.

SUMMARY OF THE DISCLOSURE

It is an object of the invention to improve rights list and/or access control list (ACL) filters management. Particularly, it is an object of the invention to improve access control scalability and performance for content servers or content management systems.

In some embodiments, these and other objects of the invention may be realized in a special database server having a transitive closure management module. The transitive closure management module may be embodied on non-transitory computer readable medium and include instructions translatable to perform particular functions, including receiving an identification of an entity defined in a database storing a cached transitive closure and interacting with a relational database management system according to a relational query language to incrementally update the cached transitive closure stored in the database. In some embodiments, the transitive closure management module may incrementally update the cached transitive closure by generating a new transitive closure for the entity and determining a delete transitive closure record. In some embodiments, the delete transitive closure record may be determined by the transitive closure management module analyzing the cached transitive closure and the new transitive closure, determining a first transitive closure path for the entity that is not specified in the new transitive closure and that is specified in the cached transitive closure, and selecting as the delete transitive closure record a record specifying the first transitive closure path. The transitive closure management module may then delete the delete transitive closure record from the cached transitive disclosure.

In some embodiments, a database server may receive a request to access a resource, the request including a user identifier of a user, the user being a member of a first group, the first group being a member of a second group. The database server may generate a new transitive closure group membership list for the user including a list of entries including the first group and the second group. The database server may update a master transitive closure group membership list including entries for user group memberships. In some embodiments, this may include determining an entry for the user in the master transitive closure group membership list that does not match any entries for the user in the new transitive closure group membership list and deleting the entry from the master transitive closure group membership list. The database server may determine an entry for the user in the new transitive closure group membership list that does not match any entries for the user in the master transitive closure group membership list and adding the entry to the master transitive closure group membership list.

One embodiment may comprise a system having a processor and a memory and configured to implement a method disclosed herein. One embodiment may comprise a computer program product that comprises a non-transitory computer-readable storage medium which stores computer instructions that are executable by at least one processor to perform the method. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

FIGS. 4A-4E are diagrams illustrating one embodiment of updating a cached transitive closure.

DETAILED DESCRIPTION

Systems and methods of maintaining transitive closure and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of this disclosure will become apparent to those skilled in the art from this disclosure.

Figure 1:
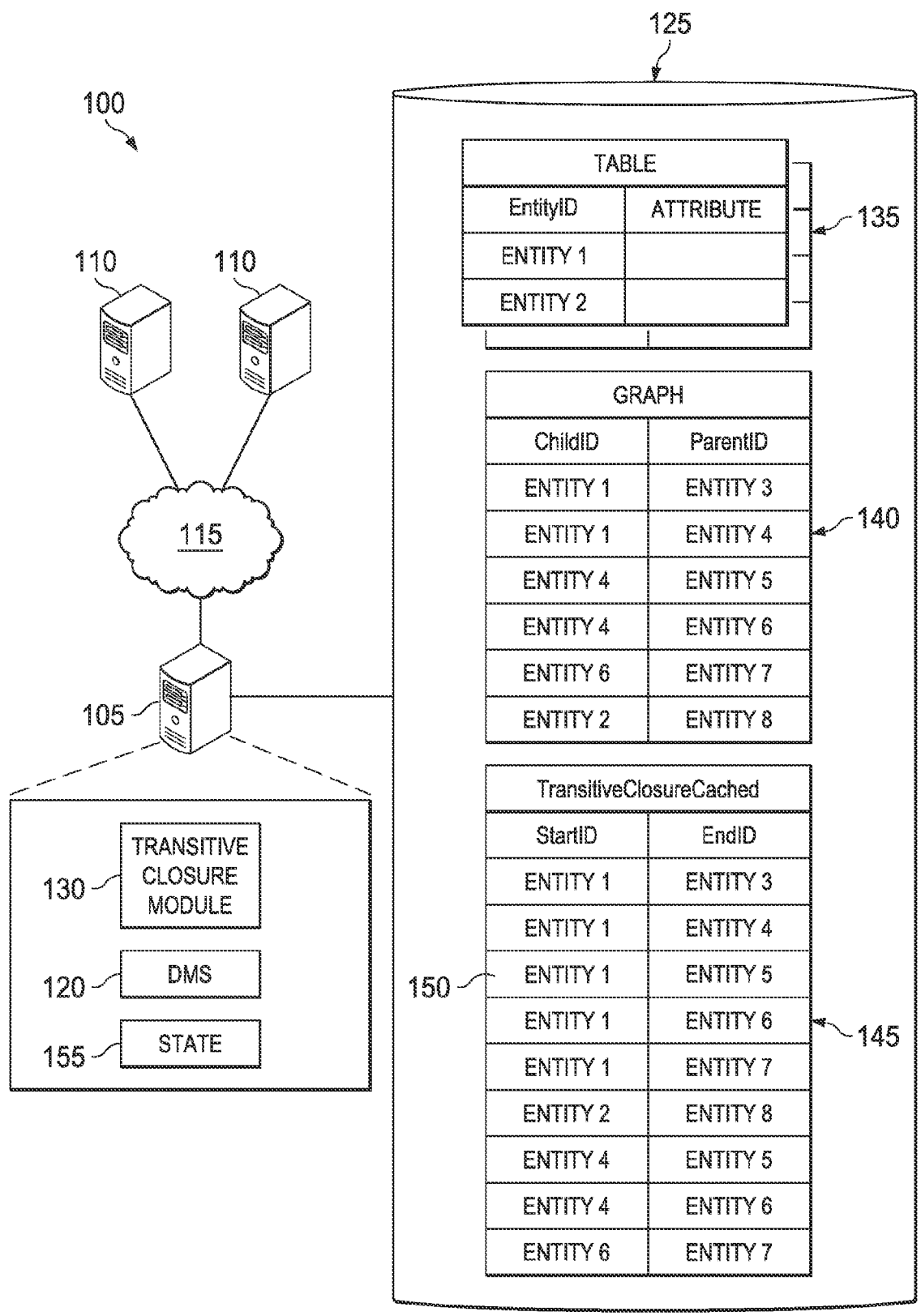
FIG. 1 is a block diagram illustrating one embodiment of a transitive closure system.

FIG. 1 is a diagrammatic representation of a transitive closure system 100 comprising a database server 105 coupled to one or more additional servers 110 or other computing devices, by a network 115. Database server 105 may include a database management system (DMS) 120, such as a relational database management system (RDMS) other database management system that manages a database 125. According to one embodiment, DMS 120 may support a relational query language, such as SQL, or other relational query language. Database server 105, an authorization server or other server 110 may also include a transitive closure module 130 that can interact with DMS 120 using the relational query language or other interface.

Database 125 may contain various tables 135 including records for various entities. The entities may vary based on application. For example, for an access control system, the entities may include users, groups (including roles), files, directories and other entities whereas for a travel application, the entities may include cities, flights, customers, fares, promotions or other entities. In any event, database 125 may include a graph 140 expressing edges between entities in database 125. Graph 140 may be explicitly entered, generated by DMS 120 or otherwise provided. According to one embodiment graph 140 can be a directed acyclic graph.

Database 125 may also store a cached transitive closure 145 for some or all of the entities in graph 140. A cached transitive closure record for an entity specifies that there is a path in graph 140 from that entity to the associated entity. Using the example of cached transitive closure record 150 for Entity 1, there is a transitive closure record 150 that specifies the transitive closure path {Entity 1, Entity 5}, reflecting the edge {Entity 1, Entity 4} and edge {Entity 4, Entity 5} in graph 140. According to one embodiment, transitive closure module 130 may generate queries to DMS 120 to cause creation of cached transitive closure 145, which may be a transitive closure of graph 140.

In some cases, cached transitive closure 145 may be used when responding to requests from server 110 or other computing device. In servicing a request, transitive closure module 130 may determine a database entity relevant to the request and interact with DMS 120 to retrieve information from database 125 based on the cached transitive closure records for the entity. However, if graph 140 has changed, cached transitive closure 145 may be out of date. To address this issue, transitive closure module 130 may maintain state information 155 to track when the status of graph 140 changes.

When transitive closure module 130 receives a request relevant to an entity, transitive closure module 130 can check state information 155 to determine if the cached transitive closure records for the entity are out of date. If not, the request can be serviced using the cached transitive closure records. If the records are out of date, transitive closure module 130 can interact with DMS 120 to update cached transitive closure 145.

The transitive closure of graph 140 for an entity may include thousands, tens of thousands, millions or more entries. Consequently, updating the entire transitive closure for the entity may require a substantial amount of time. To obviate this problem, embodiments of transitive closure module 130 may interact with DMS 120 to incrementally update cached transitive closure 145.

Figure 2:
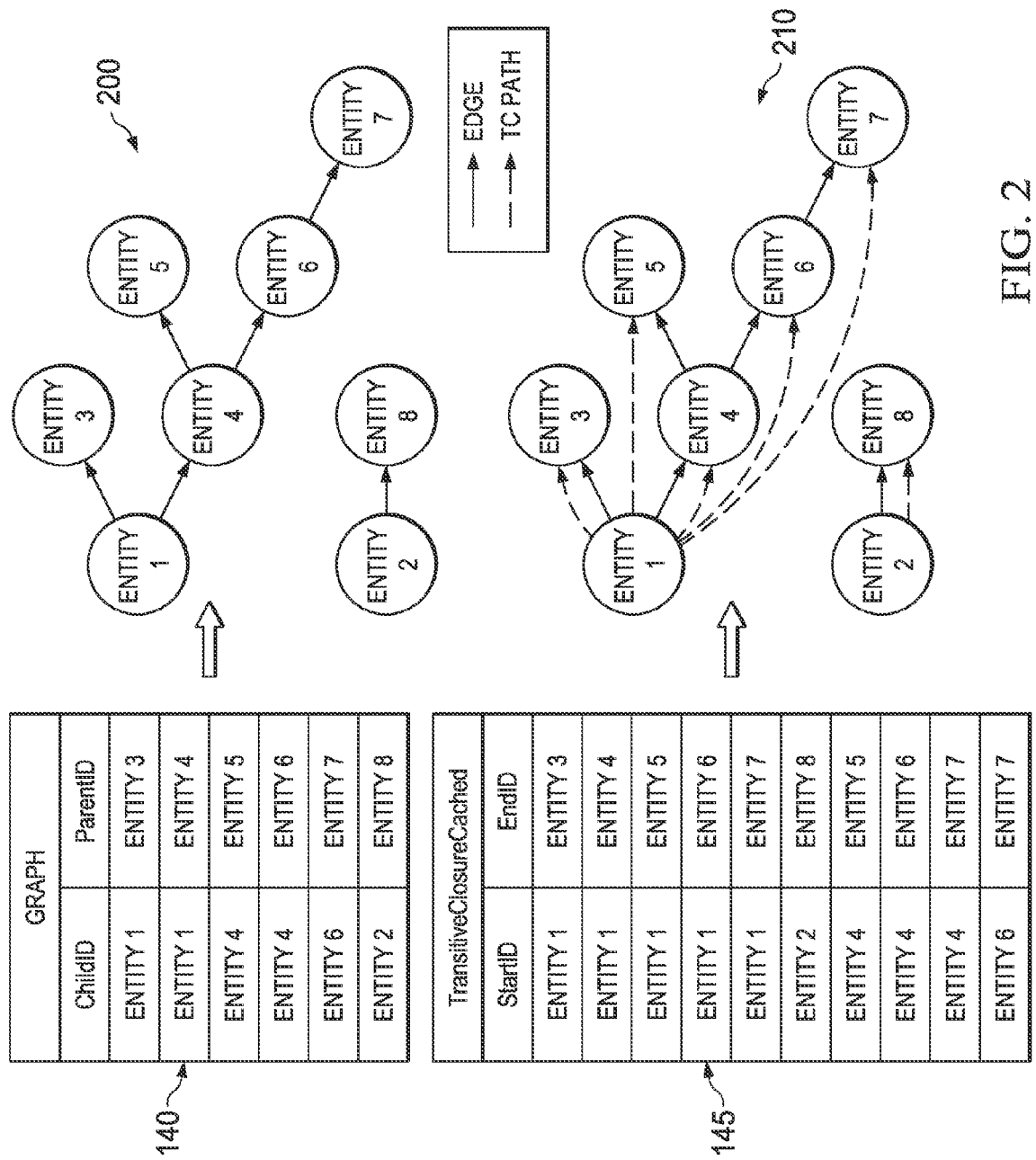
FIG. 2 is a diagram illustrating one embodiment of a graph and a transitive closure.

Before discussing incremental updates to cached transitive closure 145, some additional context may be helpful. FIG. 2 is a diagrammatic representation of one embodiment of an initial state of graph 140 and the corresponding directed edge-node representation 200 illustrating the direct relationships between entities expressed in graph 140. FIG. 2 also illustrates an initial state of transitive closure 145 of graph 140 and the corresponding edge-node representation 210 further showing the transitive closure paths from Entity 1 and Entity 2, as denoted by the dashed lines. It may be noted that in some cases, only the transitive closures of certain entities are maintained. For example, while cached transitive closure 145 includes records for all the transitive closure paths that can be derived from graph 140, cached transitive closure 145, in other embodiments, may only include transitive closure records for a certain subset of entities in graph 140 (e.g., Entity 1 and Entity 2).

Figure 3:
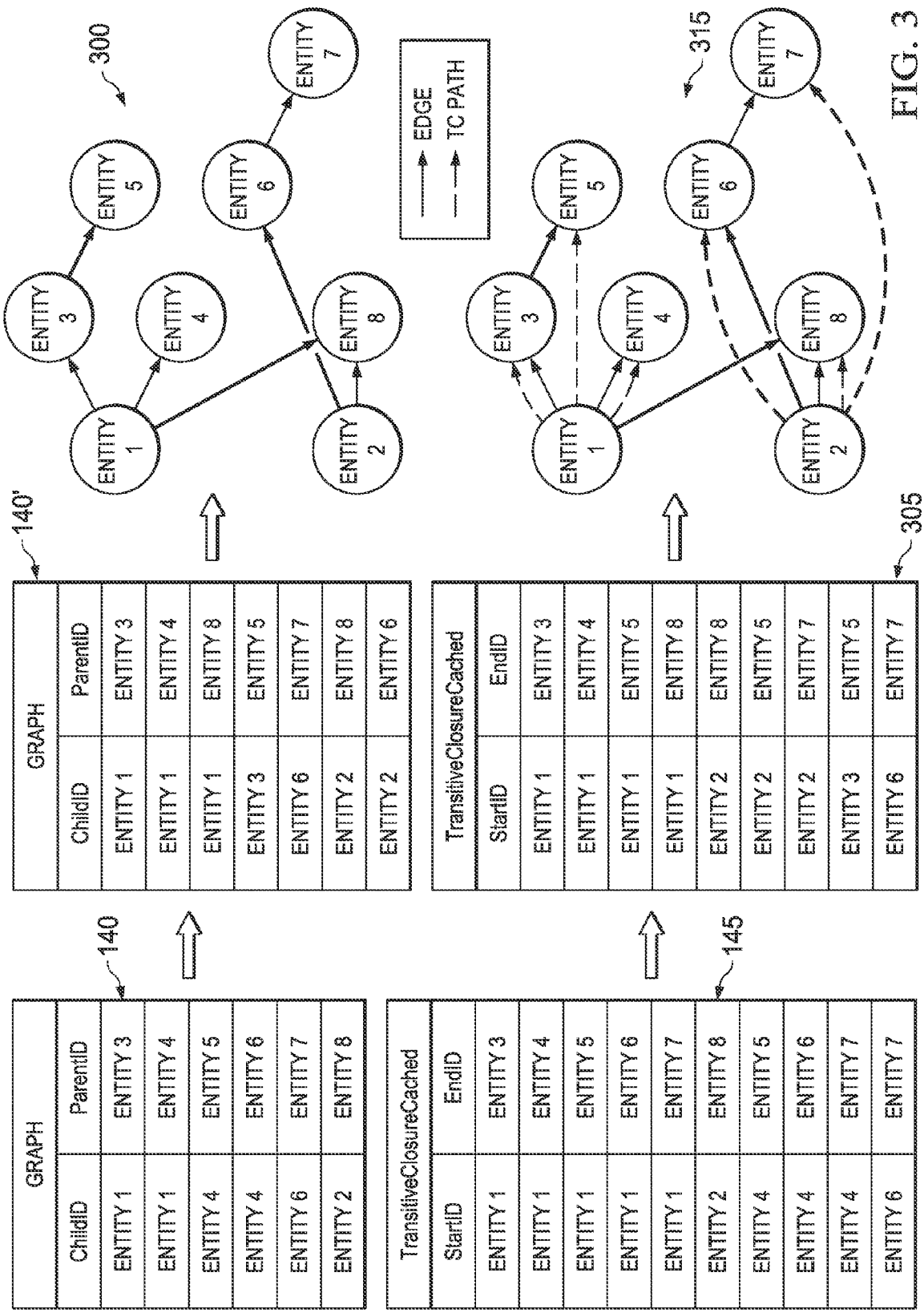
FIG. 3 is a diagram illustrating one embodiment of an updated graph and transitive closure.

FIG. 3 is a diagrammatic representation of graph 140 being updated from the initial state to a new state (represented by graph 140') and the corresponding updated edge-node graph representation 300 with new connections in bold. FIG. 3 also illustrates cached transitive closure 145 updated to cached transitive closure 305 of graph 140' and including the transitive closure paths that can be derived from graph 140'. Edge-node representation 315 illustrates the transitive closure paths for Entity 1 and Entity 2 according to cached transitive closure 305 (new paths denoted by bold dashed lines). However, updating transitive closure 145 for all entities (even if transitive closure 145 only includes transitive closures for a subset of entities in graph 140) can be time consuming and may not be necessary to service particular requests. Accordingly, transitive closure 145 may be incrementally updated.

According to one embodiment, to incrementally delete records, a new transitive closure R' for an entity is calculated. The set theoretic difference of cached transitive closure (R) and a newly computed transitive closure (R') can be determined according to (R\R') to determine a set of delete records (D), and the resulting rows deleted from the cache in the database. Thus, $R_{i+1}=R_i-D$ for removing records.

To incrementally insert records, the set theoretic difference of a newly computed transitive closure (R') and a cached transitive closure (R) can be determined according to (R'\R) to determine a set of insert records (I) and resulting records added to the cache. Thus, $R_{i+1}=I+R_i$ for inserting records.

FIGS. 4A-4E illustrate one embodiment of incrementally updating cached transitive closure 145. While incremental deletion is described before incremental insertion, incremental insertion may occur first. The steps of FIGS. 4A-4E can be implemented through issuing appropriate queries to a database (e.g., by transitive closure module 130 sending queries to DMS 120 of FIG. 1).

FIG. 4A is a diagrammatic representation of generating a new transitive closure. When a request is received (e.g., by transitive closure module 130 of FIG. 1) for which transitive closure records for an entity will be used and the cached transitive closure records for the entity are out of date, a new transitive closure 400 of the current graph can be generated for the entity. FIG. 4A, for example, illustrates that a new transitive closure 400 of updated graph 140' can be generated for Entity 1. New transitive closure 400 can be produced by an in-memory structure such as a common table expression (CTE) that is temporarily held in memory. While in FIG. 4A, new transitive closure 400 only includes transitive closure records for a specific entity; new transitive closure 400 may include records for multiple entities in other embodiments.

FIG. 4B is a diagrammatic representation illustrating that the cached transitive closure records for the entity (e.g., cached transitive closure records 405 for Entity 1) and the new transitive closure 400 can be analyzed to determine a difference of cached transitive closure records 405 and new transitive closure 400 to identify a set of delete records 410. In this case, delete records 410 include the transitive closure paths for Entity 1 found in cached transitive closure 145 and not in new transitive closure 400.

FIG. 4C is a diagrammatic representation illustrating that a set of delete records 410 may be deleted from cached transitive closure 145 to update cached transitive closure 145 (represented by updated cached transitive closure 145').

Figure 4E:
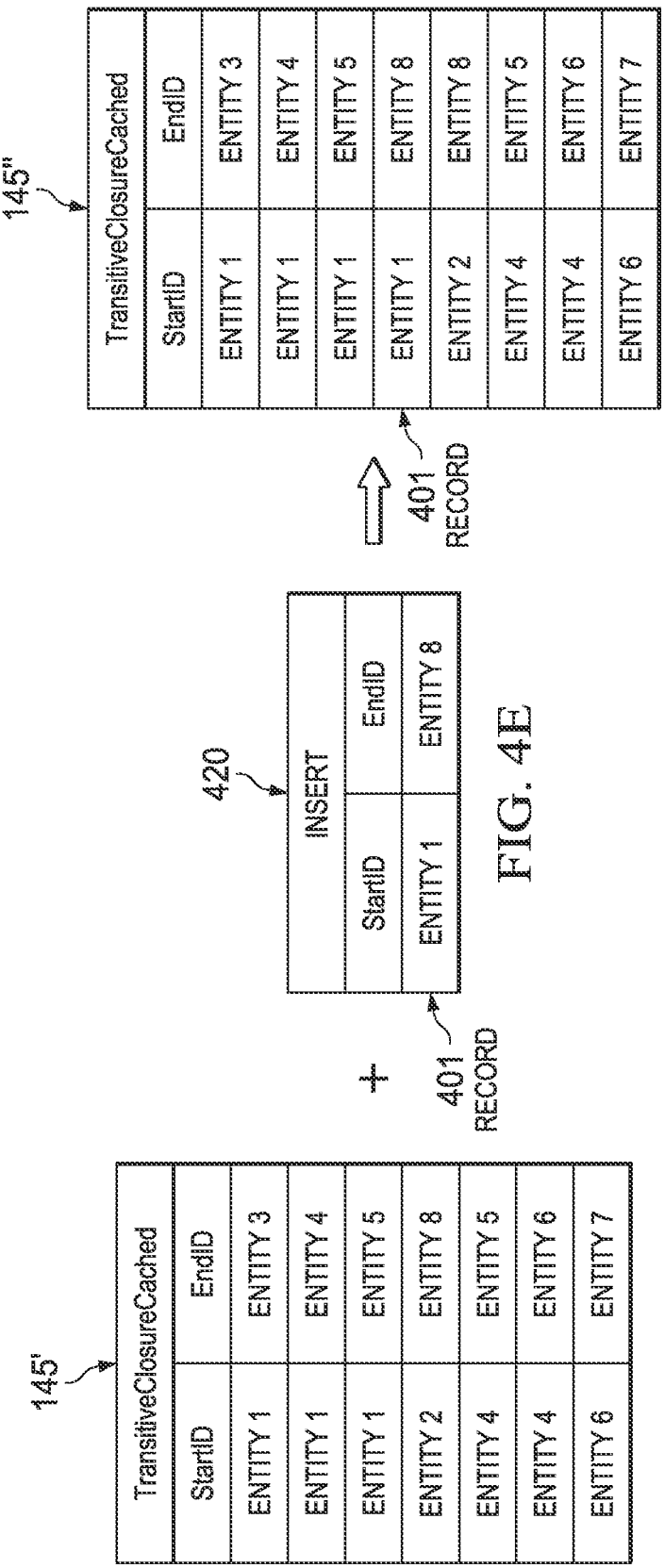

FIG. 4D is a diagrammatic representation illustrating that a set of insert records 420 can be determined based on a difference of new transitive closure 400 and cached transitive closure records 405'. Insert records 420 can be records that contain transitive closure paths found in new transitive closure 400 but not the cached transitive closure 145'. In the example of FIG. 4D, record 401 illustrates a difference of new transitive closure 400 and cached transitive closure records 405'. FIG. 4E is a diagrammatic representation illustrating that the set of insert records 420 (which, in this example, comprises record 401, as determined by the steps illustrated in FIG. 4D) can be added to cached transitive closure 145' to create updated cached transitive closure 145".

Figure 5:
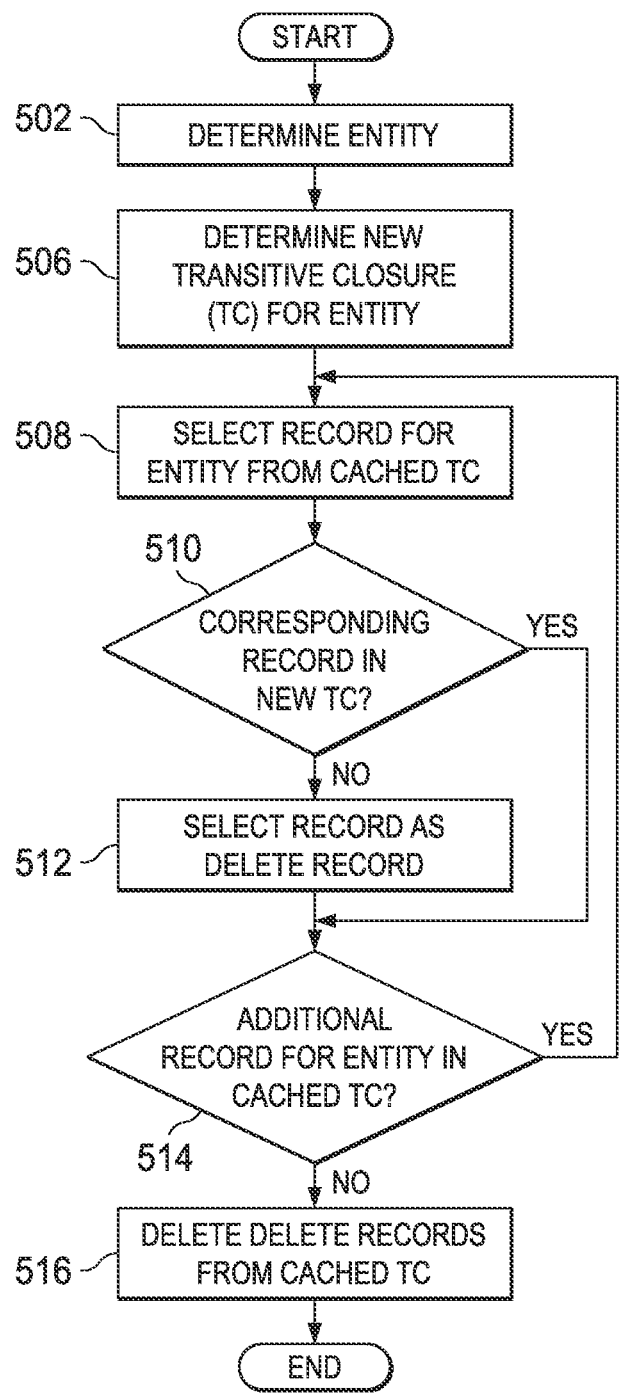
FIG. 5 is a flow chart illustrating one embodiment of incrementally deleting entries from a cached transitive closure.

FIG. 5 is a flow chart illustrating one embodiment of incrementally updating a cached transitive closure to delete records. The method of FIG. 5 can be implemented, for example, by transitive closure module 130. At step 502, the entity for which a transitive closure update is required can be determined. At step 506, a new transitive closure for the entity is generated. The new transitive closure for the entity can be determined from a persistent or temporary graph of database entities. At step 508, a record for the entity from the cached transitive closure can be selected. The cached transitive closure record and new transitive closure for the entity can be analyzed to determine if the cached transitive closure record specifies a transitive closure path that is also specified in the new transitive closure (step 510). If the record specifies a transitive closure path not specified in the new transitive closure, the cached transitive closure record can be selected as a delete record (step 512). Each cached transitive closure record for the entity can be evaluated to determine the set of delete records (step 514). At step 516, the delete records can be deleted from the cached transitive closure. The steps of FIG. 5 can be repeated as needed or desired.

Figure 6:
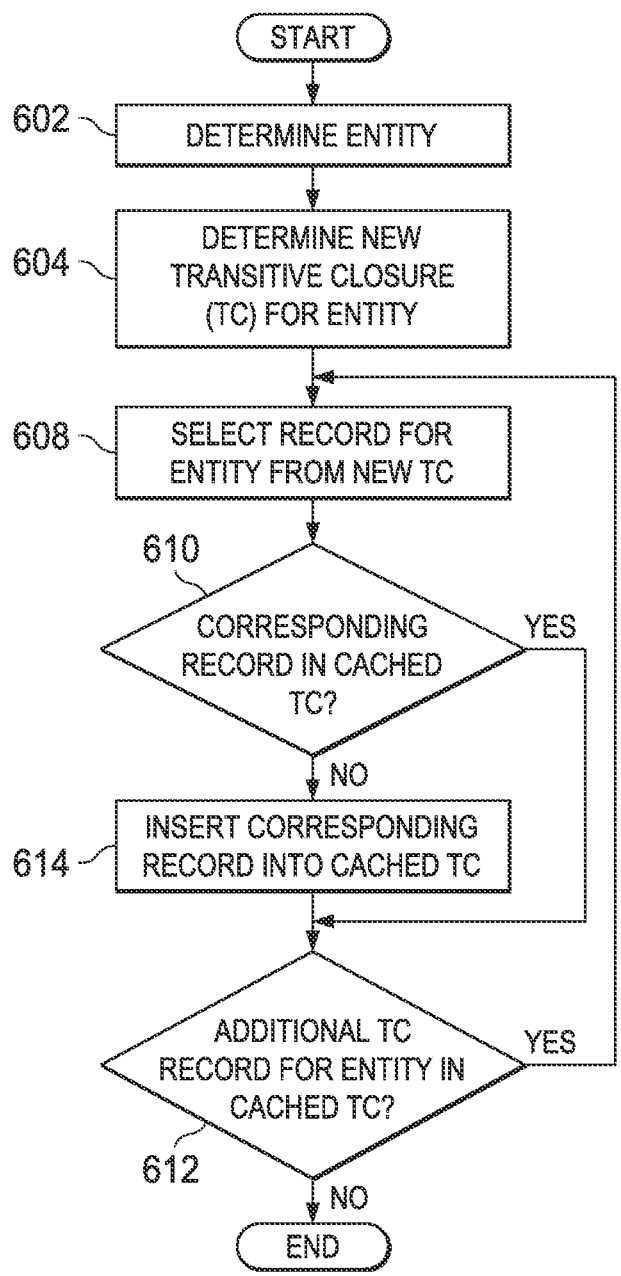
FIG. 6 is a flow chart illustrating one embodiment of incrementally inserting entries in a cached transitive closure.

FIG. 6 is a flow chart illustrating one embodiment of incrementally updating a cached transitive closure to insert records. The method of FIG. 6 can be implemented, for example, by transitive closure module 130. At step 602, the entity for which a transitive closure update is required can be determined. At step 604, a new transitive closure for the entity is generated. The new transitive closure for the entity can be determined from a persistent or temporary graph of database entities. At step 608, a record for the entity from the new transitive closure can be selected. The cached transitive closure and new transitive closure record for the entity can be analyzed to determine if the new transitive closure record specifies a transitive closure path that is also specified in the cached transitive closure (step 610). If the new transitive closure record specifies a transitive closure path not specified in the cached transitive closure, a new record can be inserted into the cached transitive closure for the transitive closure path (step 614). Each new transitive closure record for the entity can be evaluated to determine the complete set of records to insert (step 612). The steps of FIG. 6 can be repeated as needed or desired.

Figure 7:
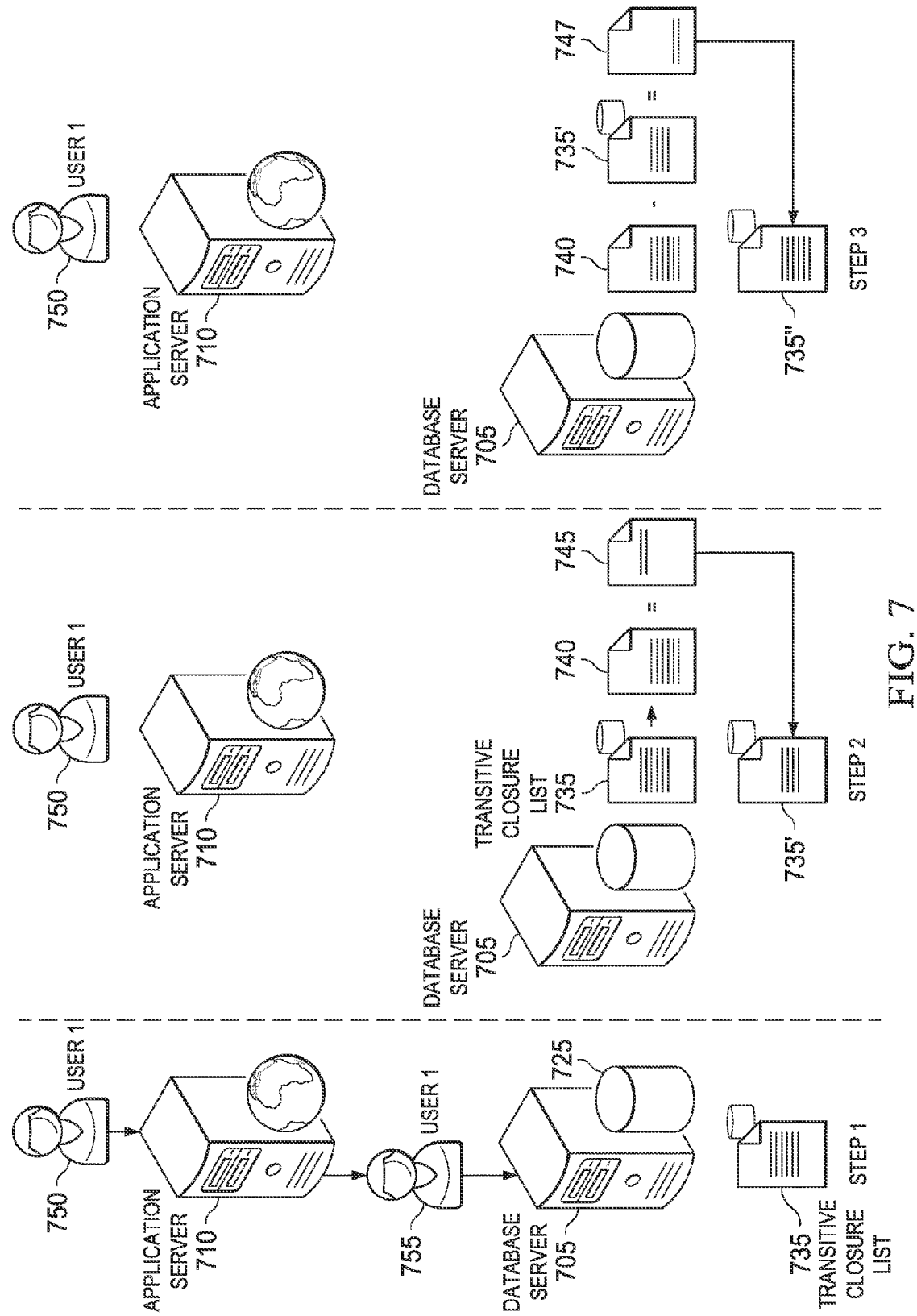
FIG. 7 is a diagram illustrating one embodiment of a system updating a cached transitive closure.

FIG. 7 illustrates one embodiment of an authentication system in which a database server 705 maintains a database 725 including a cached user rights list 735. Cached user rights list 735 provides transitive closure paths between users and related entities from which the users inherit rights. The related entities may comprise groups, roles or other entities.

Database server 705 or other computing device (e.g., application server 710) may maintain a set of state information used to determine whether cached transitive closure list 735 is stale. According to one embodiment, server 705 maintains a state number for each user, and a global system state. When that user is added to or removed from any group, that user's state number is incremented. When a group is added to or removed from any other group the global system state changes. If either the user state or global system state has changed since the transitive closure for the user was last determined, cached transitive closure list 735 can be considered stale.

An application server 710 can communicate with database server 705. When a user 750 makes a request for an object (e.g., a document, file, directory or other object), application server 710 can pass a user identifier (ID) 755 associated with the user to database server 705 (e.g., in a query). If the cached transitive closure list 735 is considered stale for the user, database server 705 can determine a new transitive closure from the user from a membership graph (see e.g., FIG. 8A), determine a difference of cached transitive closure list 735 and the new transitive closure 740 to determine the resulting delete records 745 and delete the appropriate rows from transitive closure list 735 to update cached user rights list 735 (as represented by user rights list 735'). Database server 705 can further determine a difference of user right list 735' and new transitive closure 740 to determine a set of insert records 747 and insert the insert records 747 into the cached user right list 735' to update the cached user rights list (as represented by cached user rights list 735"). Insertion may occur before or after deletion.

Figure 8A:
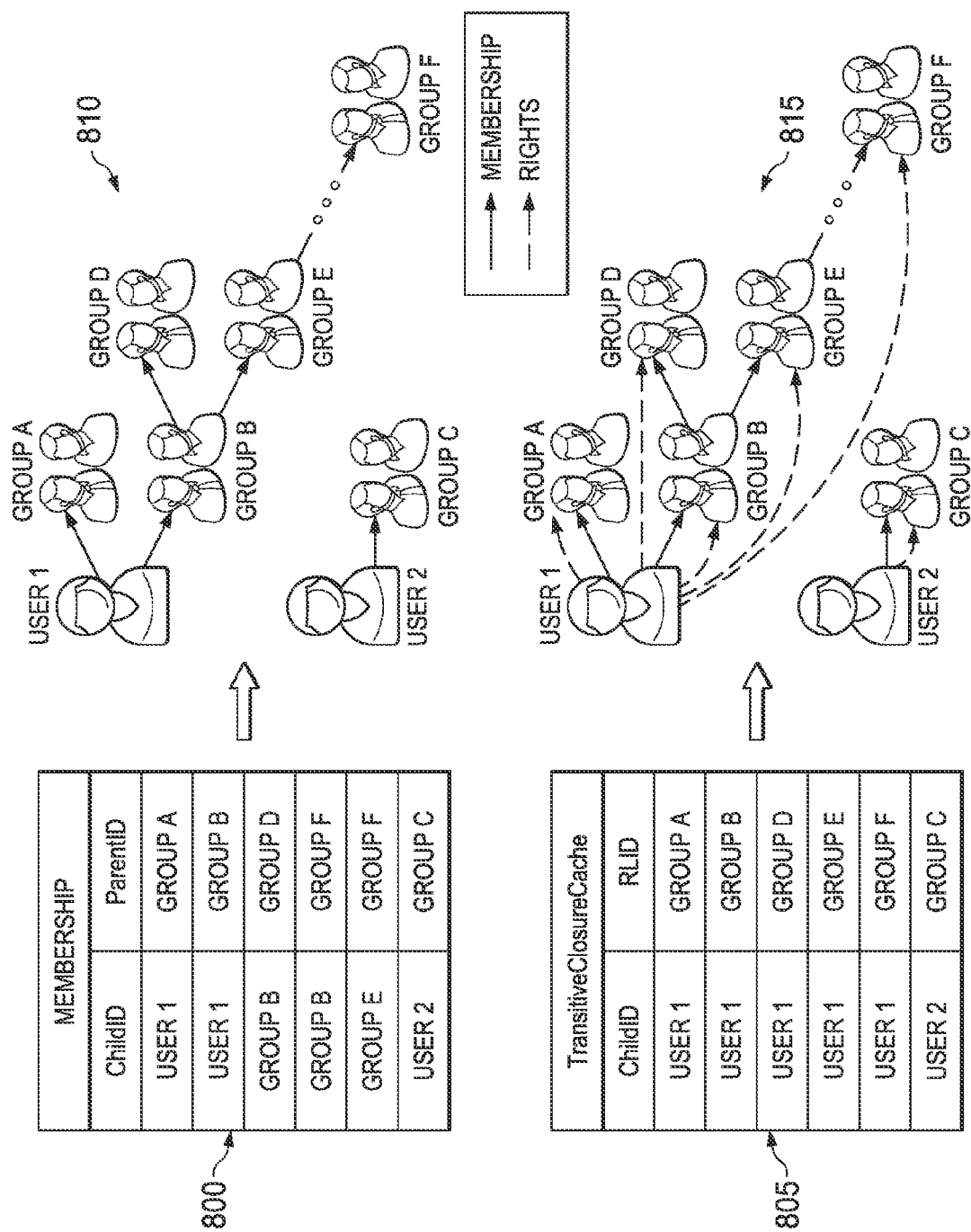
FIGS. 8A-8G are diagrams illustrating another embodiment of updating a cached transitive closure.

FIG. 8A-8G are diagrammatic representations of another embodiment incrementally updating a user rights list. FIG. 8A illustrates an initial state of a membership graph 800 containing explicit user and group memberships with corresponding edge-node representation 810 and an initial state of transitive closure 805 of membership graph 800 and corresponding edge-node graph 815 showing the initial transitive closure paths (in this case effective rights) for each user. Cached transitive closure 805 can provide a rights list that associates each user with other database entities from which the user inherits rights.

Figure 8B:
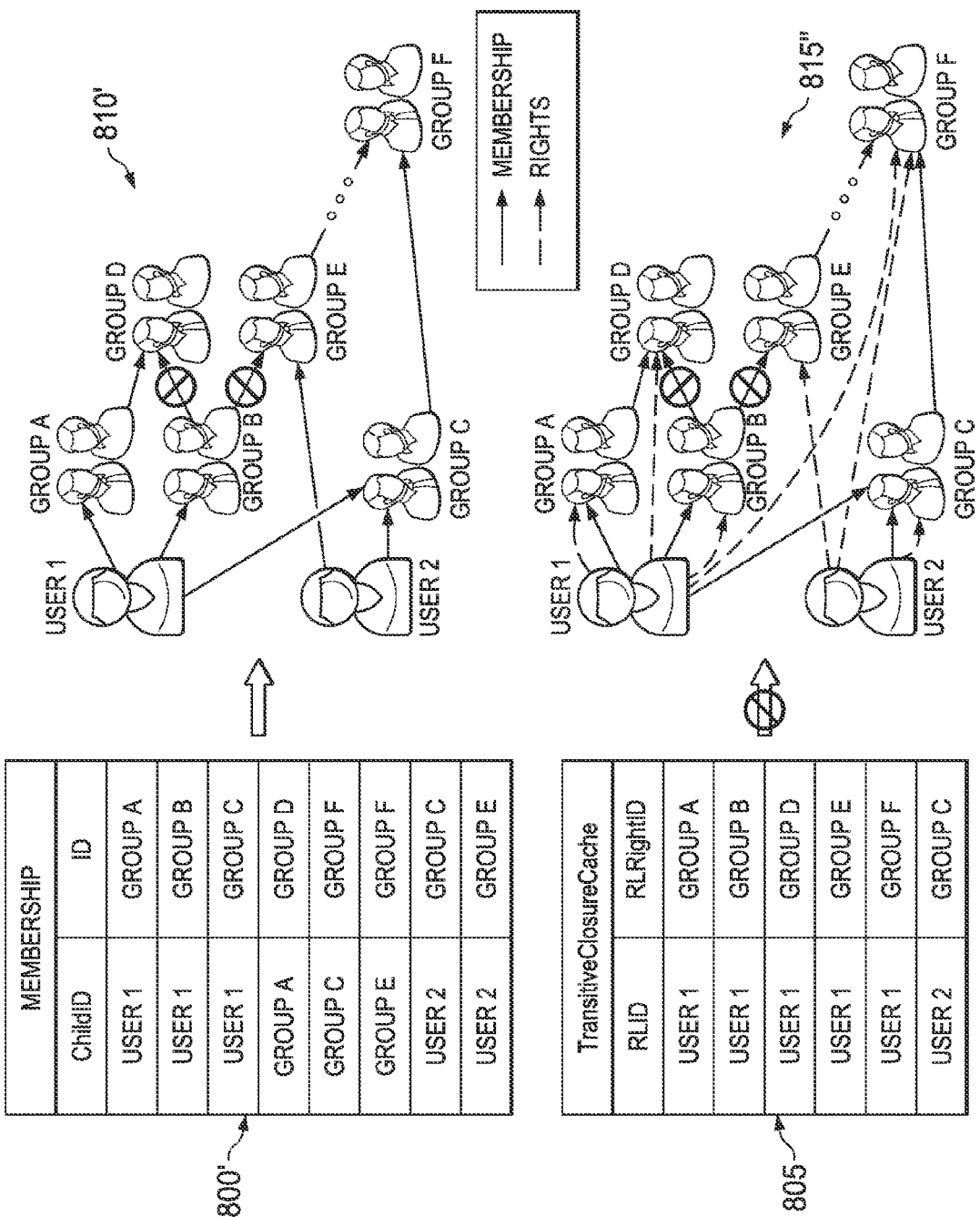

FIG. 8B illustrates updated graph 800' and edge-node representation 810' and updated edge-node graph 815' showing the effective rights for User 1 and User 2 that should be in effect according to graph 800'. However, if cached transitive closure 805 has not yet been updated, cached transitive closure 805 will not include the appropriate effective rights.

Figures 8C, 8D:
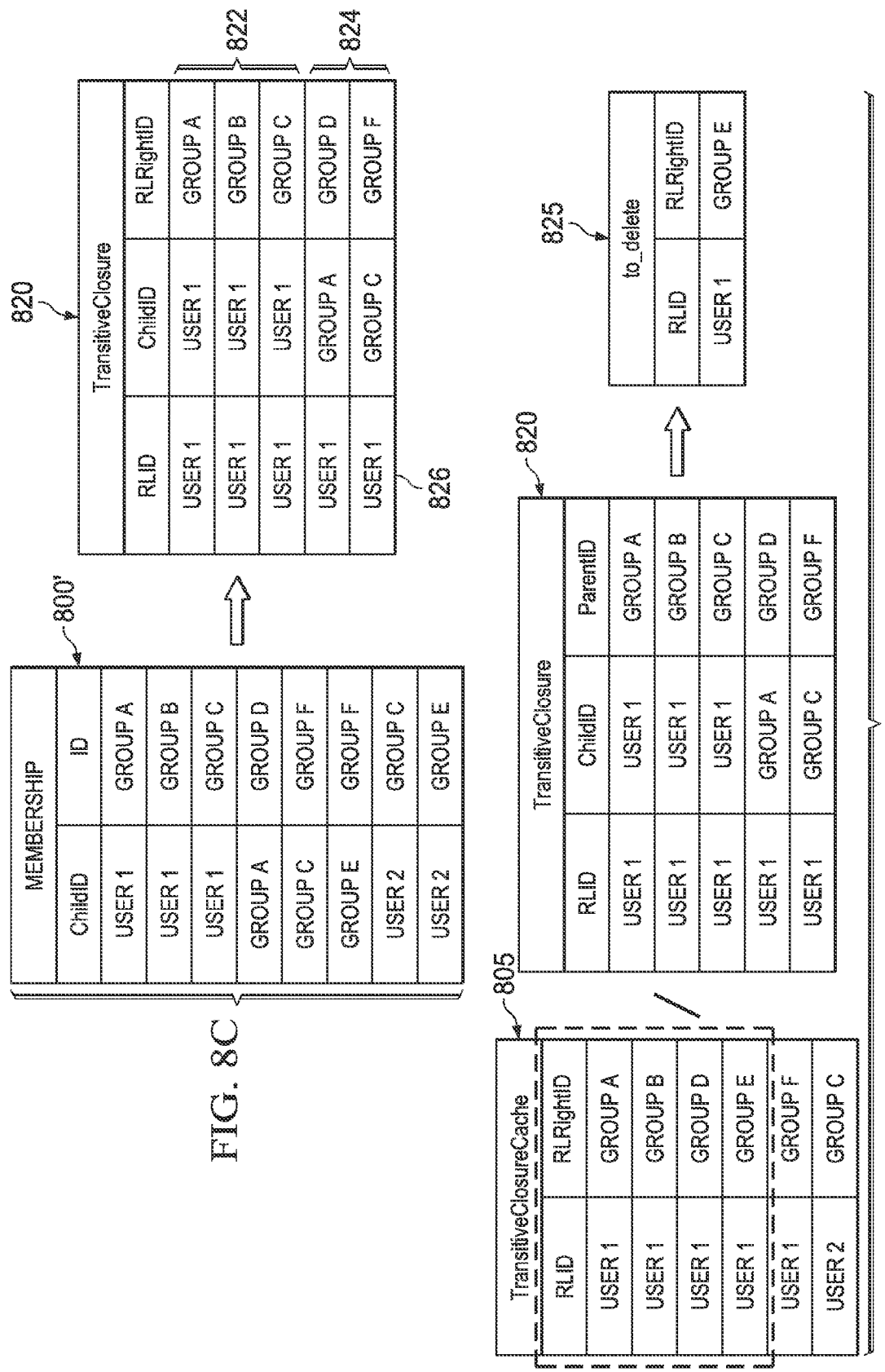

FIG. 8C illustrates that a new transitive closure 820 can be created for User 1. New transitive closure 820 can include i) a set of new transitive closure records 822 reflecting relationships explicitly defined in the membership graph and ii) new transitive closure records 824 that are derived by selecting an endpoint for a transitive closure path already in new transitive closure 820 and creating transitive closure records for User 1 using the directed relationships from the endpoint in graph 800'. Thus, for example, because the path {User 1, Group C} is in new transitive closure 820, Group C can be used to find additional paths from graph 800'. In this case, graph 800' can be analyzed to determine that there is a direct relationship from Group C to Group F. Consequently, record 826 can be added to new transitive closure 820 for the path {User 1, Group F}. This process can be repeated using Group F from new transitive closure 820 to identify additional paths from graph 800' (of which there are none in this example) and so on.

Figure 8E:
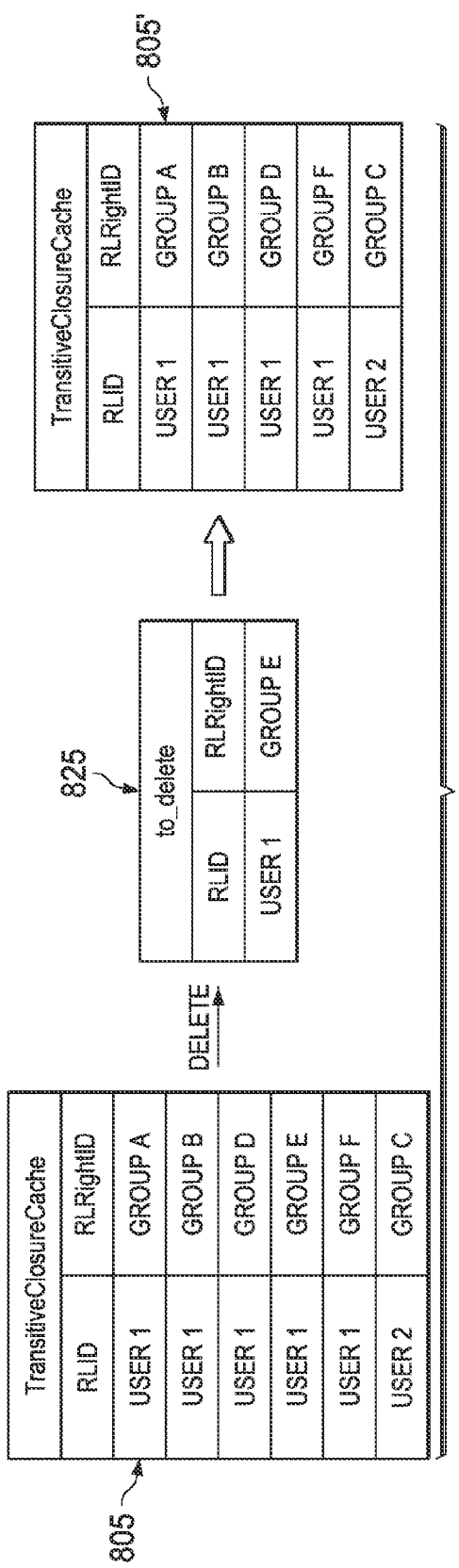

FIG. 8D illustrates that a difference of cached transitive closure 805 and new transitive closure 820 for an entity (e.g., User 1) can be determined to provide a set of delete records 825. FIG. 8E illustrates that the difference 825 can be subtracted from the cached transitive closure 805 to create updated cached transitive closure 805'. It can be noted that the records deleted comprise a transitive closure path {User 1, Group E} that was found in the cached transitive closure 805, but not the new transitive closure 820.

Figure 8F:
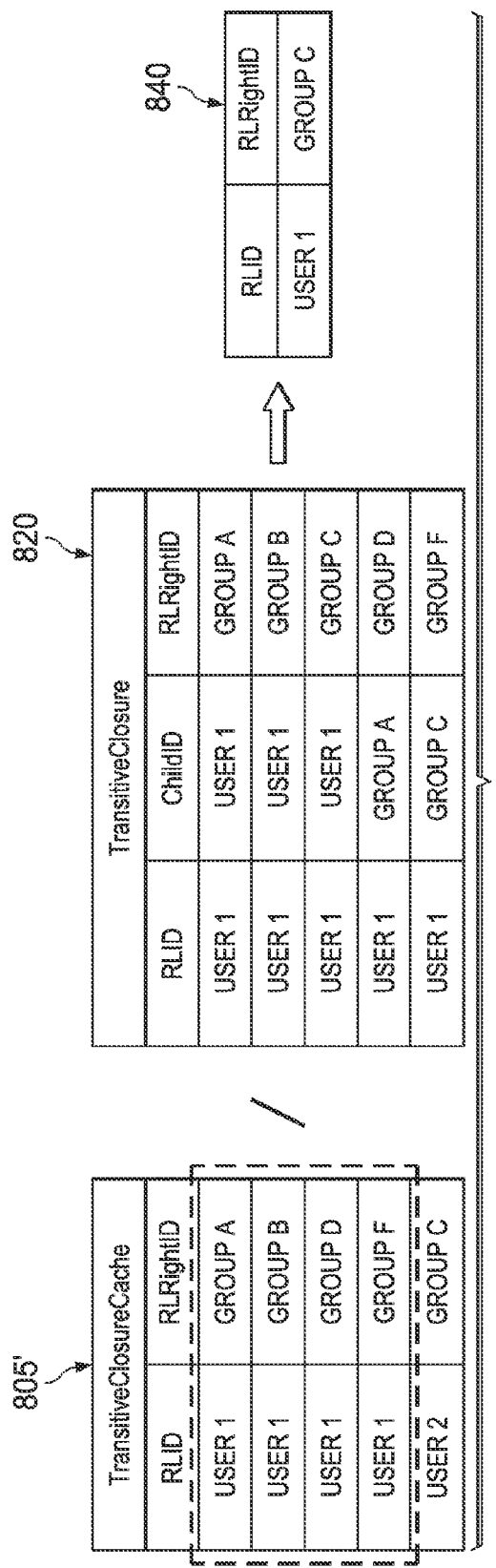
Figure 8G:
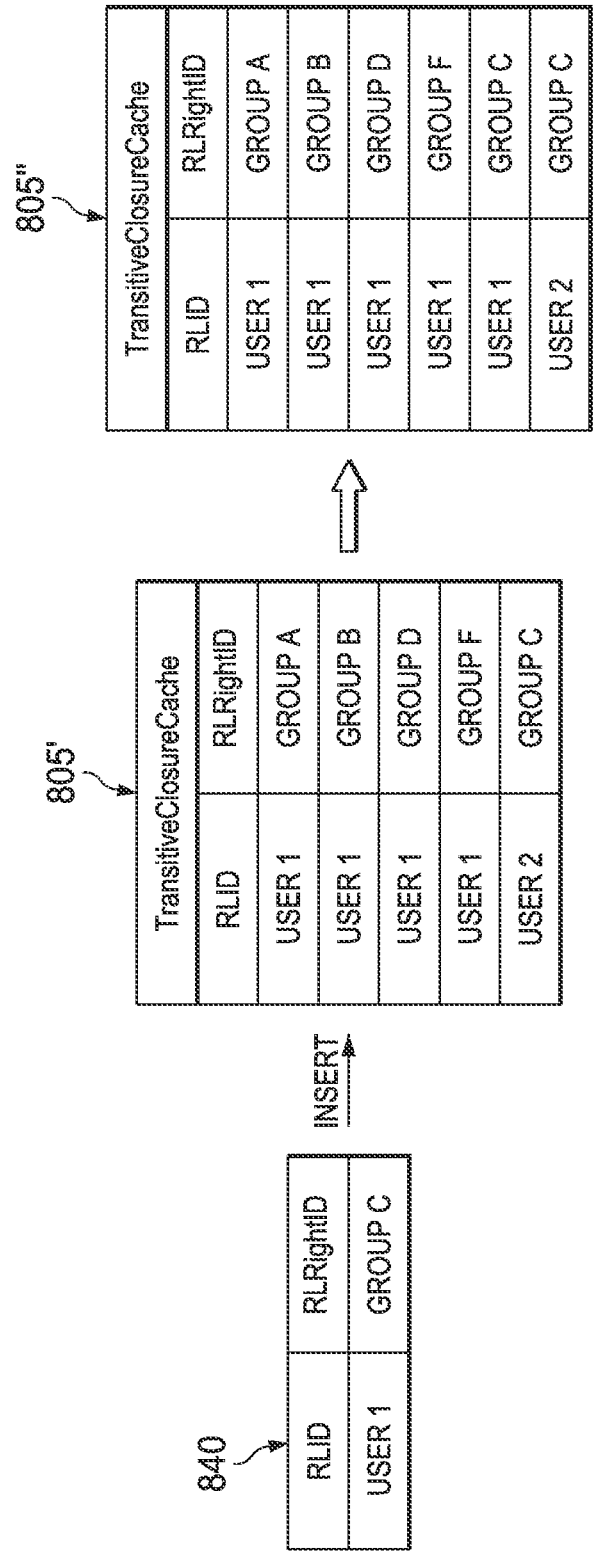

FIG. 8F illustrates that the insert records 840 can be determined from the difference of new transitive closure 820 and cached transitive closure 805'. FIG. 8G illustrates that insert records 840 can be inserted into cached transitive closure 805' to create updated transitive closure 805".

One embodiment of a method for incrementally deleting records and inserting records can be implemented according the following pseudo-code. The queries can be passed to a database management system from code running on the same computing device or another computing device. In some cases, the code may be stored and executed from the database. It can be noted that specific query commands may be specific to certain database management systems. However, one of ordinary skill in the art would understand that other queries can also be used.

```
DECLARE @ChildID BIGINT = <userID>;
WITH TransitiveClosure (RLID, ChildID, RLRightID) AS
```

-continued

```
(
SELECT
    @ChildID AS RLID, ChildID, ID AS RLRightID
FROM
    Memberships
WHERE ChildID in (@ChildID)
UNION ALL
SELECT
    @ChildID AS RLID, E.ChildID, E.ID
FROM
    Memberships AS E
    join TransitiveClosure AS M ON E.ChildID = M.RLRightID
)
DELETE FROM TransitiveClosureCache FROM
    (
    SELECT * FROM TransitiveClosureCache WHERE RLID =
    @ChildID
    EXCEPT
    SELECT * FROM
        (
        SELECT RLID, RLRightID FROM TransitiveClosure
        UNION ALL
        SELECT @ChildID, @ChildID
        )
    ) AS to_delete
WHERE
    to_delete.RLID = TransitiveClosureCache.RLID
    and to_delete.RLRightID = TransitiveClosureCache.RLRightID;
DECLARE @ChildID BIGINT = <userID>;
WITH TransitiveClosure (RLID, ChildID, RLRightID) AS
(
SELECT
    @ChildID AS RLID, ChildID, ID AS RLRightID
FROM
    Memberships
WHERE ChildID in (@ChildID)
UNION ALL
SELECT
    @ChildID AS RLID, E.ChildID, E.ID
FROM
    Memberships AS E
    join TransitiveClosure AS M ON E.ChildID = M.RLRightID
)
INSERT INTO TransitiveClosureCache
SELECT RLID, RLRightID FROM TransitiveClosure
EXCEPT
SELECT * FROM TransitiveClosureCache WHERE RLID = @ChildID;
```

In this example, updating the transitive closure has approximately the same complexity under addition of a membership as it has under deletion of a membership.

Figure 9:
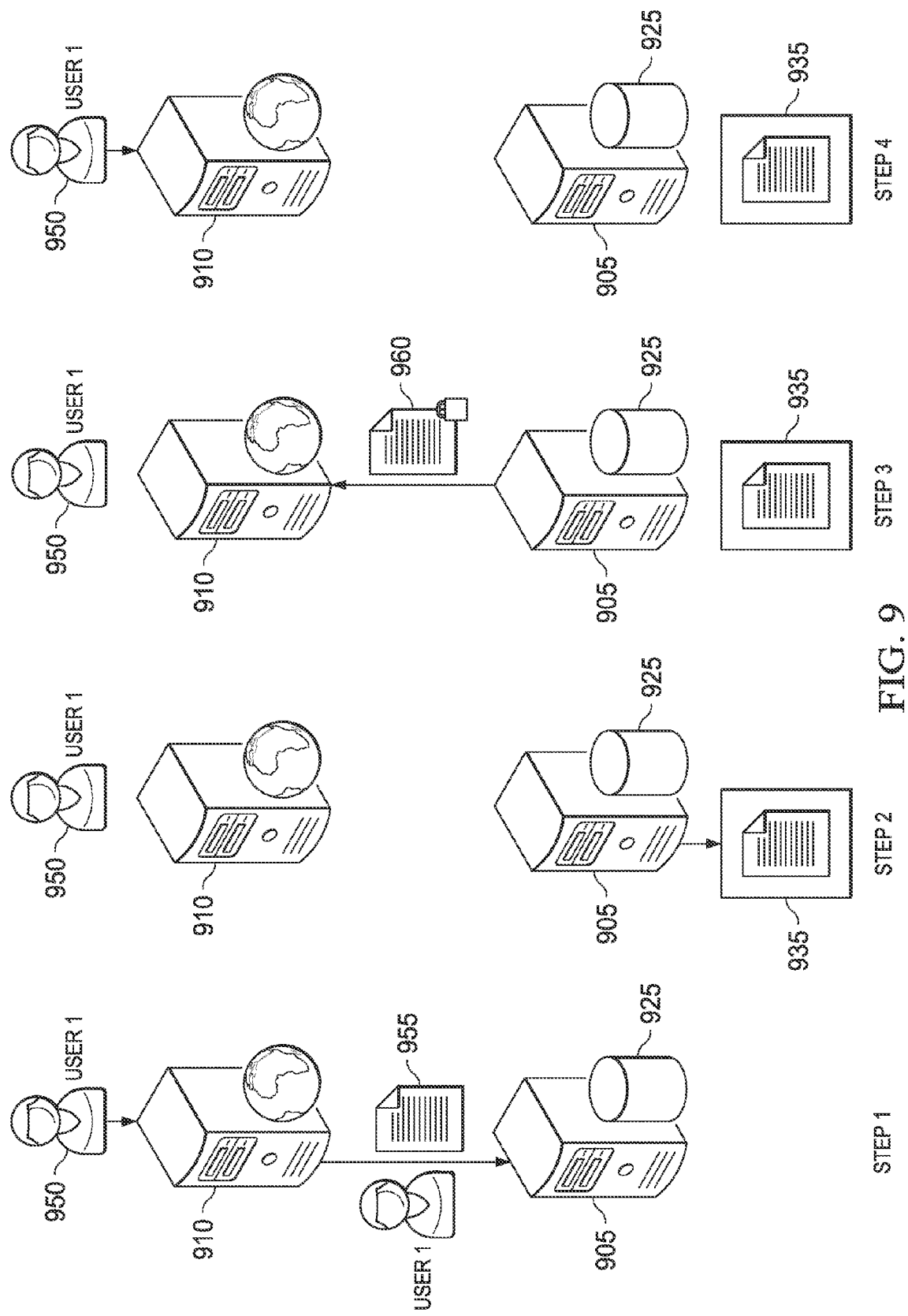
FIG. 9 is a diagram illustrating one embodiment of an authorization system.

FIG. 9 is a diagrammatic representation of one embodiment of a system for controlling access to resources, such as files, directories, topics, replies, task lists, task groups, blogs, blog entries or other resource. According to one embodiment, a database server 905 may maintain a database 925 of user rights and access control permissions. A user 950 can connect to an application server 910 and request a set of resources (documents, folders, etc. . . . ). A set of access information 955 can be passed to database server 905. Access information 955, according to one embodiment, can include the user's ID and the identity of objects the user is requesting. In some embodiments, access information 955 may be sent as part of queries to filter an access control list.

Figure 10:
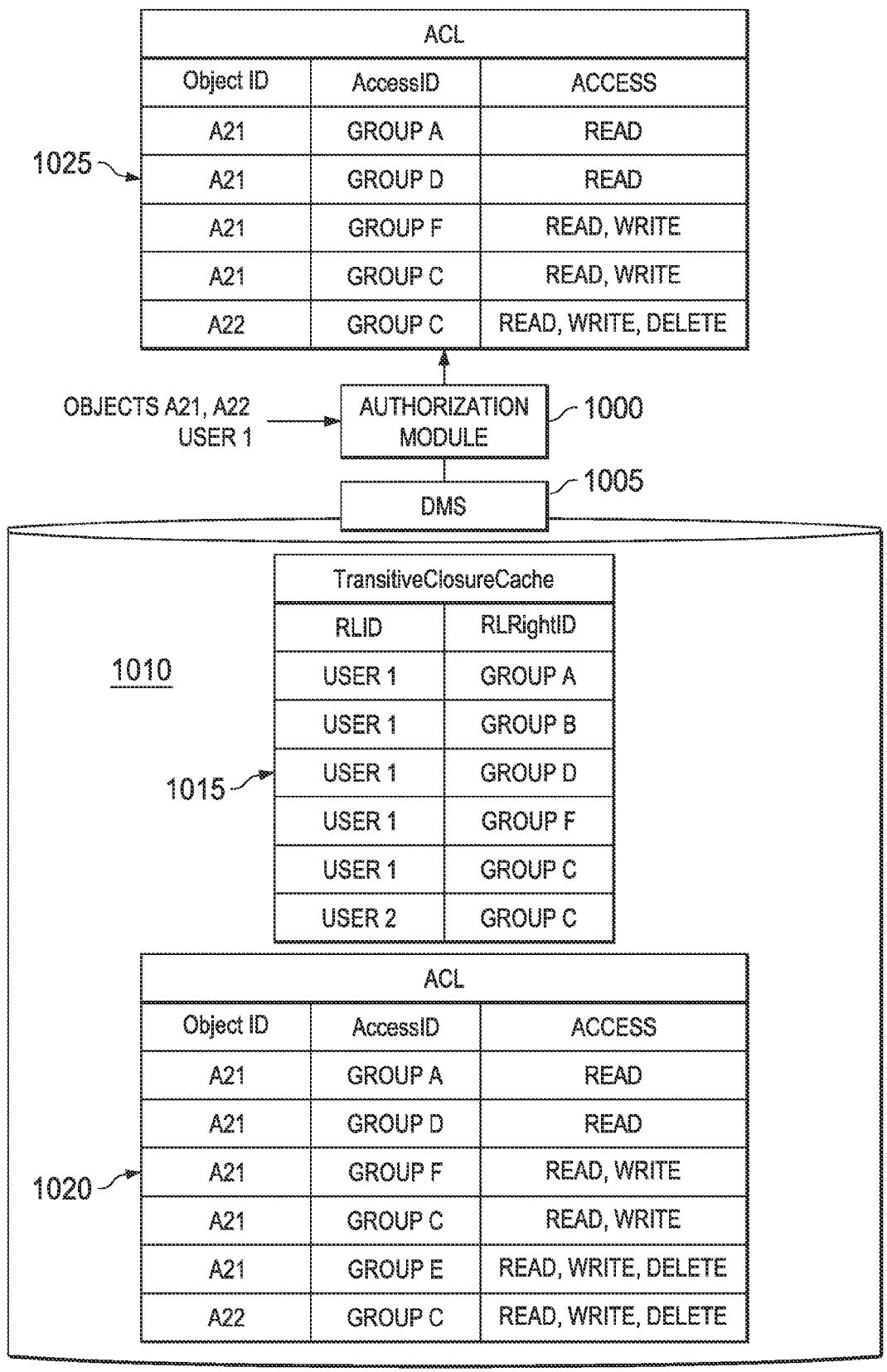
FIG. 10 is a diagram illustrating one embodiment of an authentication system.

Access control list entries for the requested objects can be filtered against a user's rights list 935 cached in the database 925 (see e.g., FIG. 10). User rights list 935 can be a cached transitive closure of a membership graph as discussed above. In some cases, the user rights list 935 may be updated prior to filtering. A filtered set of ACL entries 960 are returned to the application server 910. Application server 910 checks the user's permissions using filtered ACL entries 960 and the objects to which the user has permission are returned.

FIG. 10 is a block diagram illustrating one embodiment of an authentication system. A database server (such as database server 105 or database server 905) may include a database management system (DMS) 1005, such as a relational database management system (RDMS) other database management system that manages a database 1010. According to one embodiment, DMS 1010 may support a relational query language, such as SQL, or other relational query language. The database server, an authorization server or other server or computing device may include an authorization module 1000 that can interact with DMS 1005 using the relational query language or other interface.

Database 1010 may contain various tables including records for various entities. The entities may vary based on application. For example, for an access control system, the entities may include users, groups, roles, files, directories and other entities whereas for a travel application, the entities may include cities, flights, customers, fares, promotions or other entities. In any event, database 1010 may include a user rights list 1015 as a cached transitive closure. Database 1010 may also include an Access Control List 1020 for a set of objects.

Access Control List (ACL) 1020 can contain several Access Control Entries (ACEs). In some cases each object may have its own ACL. In other embodiments, the ACL may include entries for multiple objects. Permissions may be mapped between objects and users/groups in any suitable manner. For example, in one embodiment, an ACE maps an object to user or group, and the permissions the user or group has on that object.

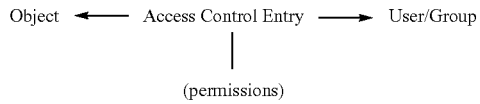

In other embodiments, policies can be abstracted from objects so that permissions are set based on policies and objects are associated with policies:

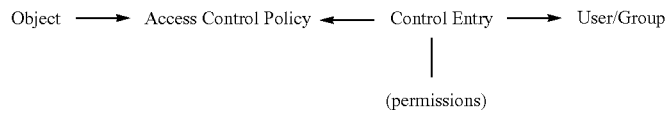

When a user requests an object or set of objects, the user's ID and object identities can be passed to authorization module 1000. Authorization module 1000 can query DMS to determine a filtered ACL 1025. The filtered ACL 1025 contains the ACL entries that match both an object requested by the user and a user/group associated with the user in the user rights list 1015. According to one embodiment, only the ACL entries that apply to the requesting user and requested objects are returned and used in checking permissions for a request.

As discussed above, embodiments may use a relational database for computation of the transitive closure. As some relational databases do not support cycles it may not be possible to determine a transitive closure from an arbitrary directed graph. As would be understood by those of ordinary skill in the art, however, a graph containing cycles can be represented equally well as a directed acyclic graph. Accordingly, a graph containing cycles can be transformed into a directed acyclic graph with no loss (e.g., a graph with cycles can be transformed into a directed acyclic graph in the context of an authorization system, with no loss in authorizations). Furthermore, while discussed primarily in terms of an authorization system, embodiments can apply to other systems where a directed graph is used.

Embodiments described herein provide several advantages. In some embodiments, a database server may provide a single cached transitive closure (or a relatively small number of cached transitive closures) that can be used to service requests from multiple application servers or multiple threads in an application server. Accordingly, there can be a single cache (or small number of caches) in the database, rather than hundreds of individual caches in server threads, dramatically increasing the cache hit ratio and reducing CPU usage spent re-computing the transitive closure of the graph.

Additionally, because some embodiments can update the transitive closure incrementally, disk I/O operations are decreased. Embodiments provide another advantage, because the transitive closure does not have to be transferred between the database and the application server to provide authorization, reducing network resources.

By eliminating a need to transfer membership lists or user rights lists (which may contain hundreds of thousands of entries) between database servers and application servers, embodiments disclosed herein can provide significant performance improvements to systems that utilize membership lists or user rights lists to perform required and/or desired functions such as task management, workflow status updates. Furthermore, embodiments disclosed herein can improve the CPU utilization by application servers as they are no longer required to compute and re-compute user rights lists. To this end, embodiments disclosed herein can also improve systems where a rights list is retrieved for various uses, for instance, to reflect a group membership change, distribute notifications, grant user permissions, personalize menu items (e.g., user-specific assignments, group membership(s), projects, task lists, workflows, etc.), determine security clearance, determine workflow permissions, etc.

Routines, methods, steps, operations or portions thereof described herein can be implemented through control logic, including computer executable instructions stored on a computer readable medium, hardware, firmware or a combination thereof. The control logic can be adapted to direct an information processing device to perform a set of steps disclosed in the various embodiments. Some embodiments may be implemented by using software programming or code in one or more digital computers, by using application specific integrated circuits, programmable logic devices, field programmable gate arrays, optical, chemical, biological, quantum or nanoengineered systems, components and mechanisms. Based on the disclosure and teachings provided herein, a person of ordinary skill in the art will appreciate other ways and/or methods to implement the invention.

Computer executable instructions or code can be stored in a computer-readable medium and can be operated on by a processor to permit a computer to perform functions, steps, operations, methods, routines, operations or portions thereof described herein. Any suitable language can be used including C, C++, Java, JavaScript, assembly language or other programming or scripting code. Different programming techniques can be employed such as procedural or object oriented. In an embodiment, HTML may utilize JavaScript to provide a means of automation and calculation through coding.

Any particular step, operation, method, routine, operation or portion thereof can execute on a single computer processing device or multiple computer processing devices, a single computer processor or multiple computer processors. Data may be stored in a single storage medium or distributed through multiple storage mediums, and may reside in a single database or multiple databases (or other data storage). The sequence of operations described herein can be interrupted, suspended, or otherwise controlled by another process, such as an operating system, kernel, etc. The routines can operate in an operating system environment or as stand-alone routines.

A "computer-readable medium" may be any type of data storage medium that can store computer instructions, including, but not limited to read-only memory (ROM), random access memory (RAM), hard disks (HD), data cartridges, data backup magnetic tapes, floppy diskettes, flash memory, optical data storage, CD-ROMs, or the like. The computer readable medium can be, by way of example, only but not by limitation, an electronic, magnetic, optical, electromagnetic, infrared, or semiconductor system, apparatus, system, device, or computer memory. The computer readable medium may include multiple computer readable media storing computer executable instructions, such as in a distributed system or instructions stored across an array.

A "processor" includes any hardware system, hardware mechanism or hardware component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will be understood for purposes of this disclosure that a service or module is one or more computer devices, configured (e.g., by a computer process or hardware) to perform one or more functions. A service may present one or more interfaces which can be utilized to access these functions. Such interfaces include APIs, interfaces presented for a web services, web pages, remote procedure calls, remote method invocation, etc.

Embodiments can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, memory (e.g., primary or secondary memory such as RAM, ROM, HD or other computer readable medium for the persistent or temporary storage of instructions and data) and one or more input/output ("I/O") device(s). The I/O devices can include a keyboard, monitor, printer, electronic pointing device (for example, mouse, trackball, stylus, etc.), touch screen or the like. In embodiments, the computer has access to at least one database on the same hardware or over the network.

Steps, operations, methods, routines or portions thereof of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with network and other communications protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. That is, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present).

As used herein, a term preceded by "a" or "an" (and "the" when antecedent basis is "a" or "an") includes both singular and plural of such term unless the context clearly dictates otherwise. Also, as used in the description herein, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

In the foregoing specification, the invention has been described with reference to specific embodiments. However, one of ordinary skill in the art appreciates that various modifications and changes can be made without departing from the scope of the invention. Accordingly, the specification, including the Summary and Abstract, and figures are to be regarded in an illustrative rather than a restrictive sense, and all such modifications are intended to be included within the scope of invention. The scope of this disclosure should be determined by the following claims and their legal equivalents.

What is claimed is:

1. A transitive closure system comprising:
   a database embodied on a non-transitory data storage medium, the database comprising a cached transitive closure of a directed graph, the cached transitive closure containing transitive closure records for some or all entities in the directed graph, each transitive closure record specifying a transitive closure path from one entity to another entity, the transitive closure path containing at least one edge, each entity representing a user or group of users;
   at least one processor; and
   a transitive closure management module embodied on non-transitory computer readable medium including instructions translatable by the at least one processor to perform:
   receiving an identification of an entity defined in the database;
   interacting with a relational database management system receiving queries according to a relational query language, the relational database management system embodied on a non-transitory data storage medium, said interacting incrementally updating the cached transitive closure comprising:
   generating a new transitive closure for the entity from the directed graph;
   determining a delete transitive closure record, said determining the delete transitive closure record comprising:
   comparing the new transitive closure generated for the entity and the cached transitive closure in the database to determine a first transitive closure path for the entity that is not specified in the new transitive closure generated for the entity and that is specified in the cached transitive closure in the database; and
   selecting a cached transitive closure record identifying the first transitive closure path as the delete transitive closure record; and
   deleting the delete transitive closure record from the cached transitive disclosure in the database.

2. The transitive closure system of claim 1, wherein determining the delete transitive closure record for the entity comprises:
   determining a set of common records for the entity from the cached transitive closure that specify common transitive closure paths for the entity also specified by new transitive closure records for the entity in the new transitive closure; and
   selecting as the delete transitive closure record, a cached transitive closure record for the entity that is not in the set of common records for the entity.

3. The transitive closure system of claim 1, wherein determining the delete transitive closure record comprises determining a set of delete transitive closure records (D) according to D=(R\R'), where:
   R=a current set of cached transitive closure records for the entity;
   R'=a set of new transitive closure records for the entity.

4. The transitive closure system of claim 1, wherein the method further comprises:
   determining an insert record, said insert record specifying a second transitive closure path for the entity, the second transitive closure path specified in the new transitive closure but not the cached transitive closure; and
   inserting the insert record in the cached transitive closure.

5. The transitive closure system of claim 4, wherein determining the insert record further comprises determining a set of insert transitive closure records (I) according to I=(R'\R), where:
   R=a current set of cached transitive closure records for the entity;
   R'=a set of new transitive closure records for the entity.

6. The transitive closure system of claim 1, wherein the method further comprises:
   receiving an object identifier from a server;
   filtering an access control list for the object using the cached transitive closure to create a filtered access control list; and
   returning the filtered access control list to the server.

7. The transitive closure system of claim 6, wherein filtering the access control list further comprises:
   identifying end point entities in cached transitive closure records for the entity;
   selecting permissions specified for the end point entities from the access control list, wherein the filtered access control list comprises the permissions specified for the end point entities for the object.

8. A transitive closure method comprising:
   receiving, by a transitive closure management module embodied on non-transitory computer readable medium, an identification of an entity defined in a database embodied on a non-transitory data storage medium, the database storing a cached transitive closure of a directed graph, the cached transitive closure containing transitive closure records for some or all entities in the directed graph, each transitive closure record specifying a transitive closure path from one entity to another entity, the transitive closure path containing at least one edge, each entity representing a user or group of users;
   the transitive closure management module interacting with a relational database management system according to a relational query language to incrementally update the cached transitive closure stored in the database, the relational database management system embodied on a non-transitory data storage medium, said incrementally updating the cached transitive closure by the transitive closure management module further comprising:
      generating a new transitive closure for the entity from the directed graph;
      determining a delete transitive closure record, said determining the delete transitive closure record comprising:
         analyzing the cached transitive closure in the database and the new transitive closure generated for the entity to determine a first transitive closure path for the entity that is not specified in the new transitive closure generated for the entity and that is specified in the cached transitive closure in the database; and
         selecting as the delete transitive closure record a record specifying the first transitive closure path; and
      deleting the delete transitive closure record from the cached transitive disclosure in the database.

9. The transitive closure method according to claim 8, wherein determining the delete transitive closure record for the entity comprises:
   determining a set of common records for the entity from the cached transitive closure that specify common transitive closure paths for the entity also specified by new transitive closure records for the entity in the new transitive closure; and
   selecting as the delete transitive closure record, a cached transitive closure record for the entity that is not in the set of common records for the entity.

10. The transitive closure method according to claim 8, wherein determining the delete transitive closure record comprises determining a set of delete transitive closure records (D) according to D=R\R'), where:
   R=a current set of cached transitive closure records for the entity;
   R'=a set of new transitive closure records for the entity.

11. The transitive closure method according to claim 8, further comprising:
   the transitive closure management module determining an insert record, said insert record specifying a second transitive closure path for the entity, the second transitive closure path specified in the new transitive closure but not the cached transitive closure; and
   the transitive closure management module inserting the insert record in the cached transitive closure stored in the database.

12. The transitive closure method according to claim 11, wherein determining the insert record further comprises determining a set of insert transitive closure records (I) according to I=(R'\R), where:
   R=a current set of cached transitive closure records for the entity;
   R'=a set of new transitive closure records for the entity.

13. The transitive closure method according to claim 12, further comprising:
   receiving an object identifier from a server;
   filtering an access control list for the object using the cached transitive closure to create a filtered access control list; and
   returning the filtered access control list to the server.

14. The transitive closure method according to claim 13, wherein filtering the access control list further comprises:
   identifying a set of related entities related to the entity in the cached transitive closure records for the entity;
   selecting permissions specified for the set of related entities from the access control list, wherein the filtered access control list comprises the permissions specified for the set of related entities.

15. The transitive closure method according to claim 13, wherein the server comprises an application server communicatively connected to a database server embodying the transitive closure management module.

\* \* \* \* \*